Jan. 2, 1968  C. R. WOLF ET AL  3,361,044
CEMENT FINISHING APPARATUS
Filed Sept. 7, 1965  3 Sheets-Sheet 1
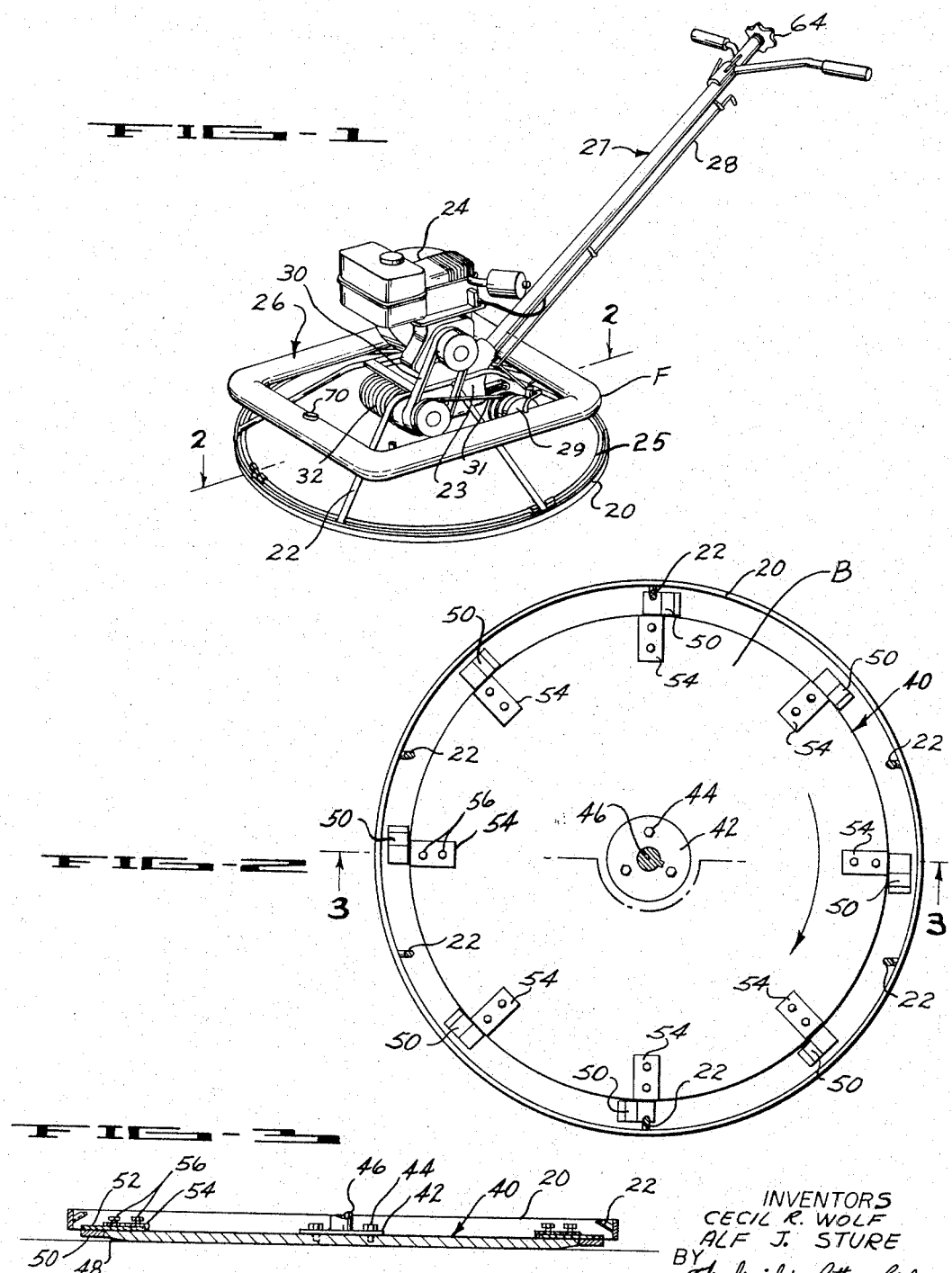
INVENTORS
CECIL R. WOLF
ALF J. STURE
BY
Fulwider, Patton, Lieber,
Lee & Utecht
ATTORNEYS

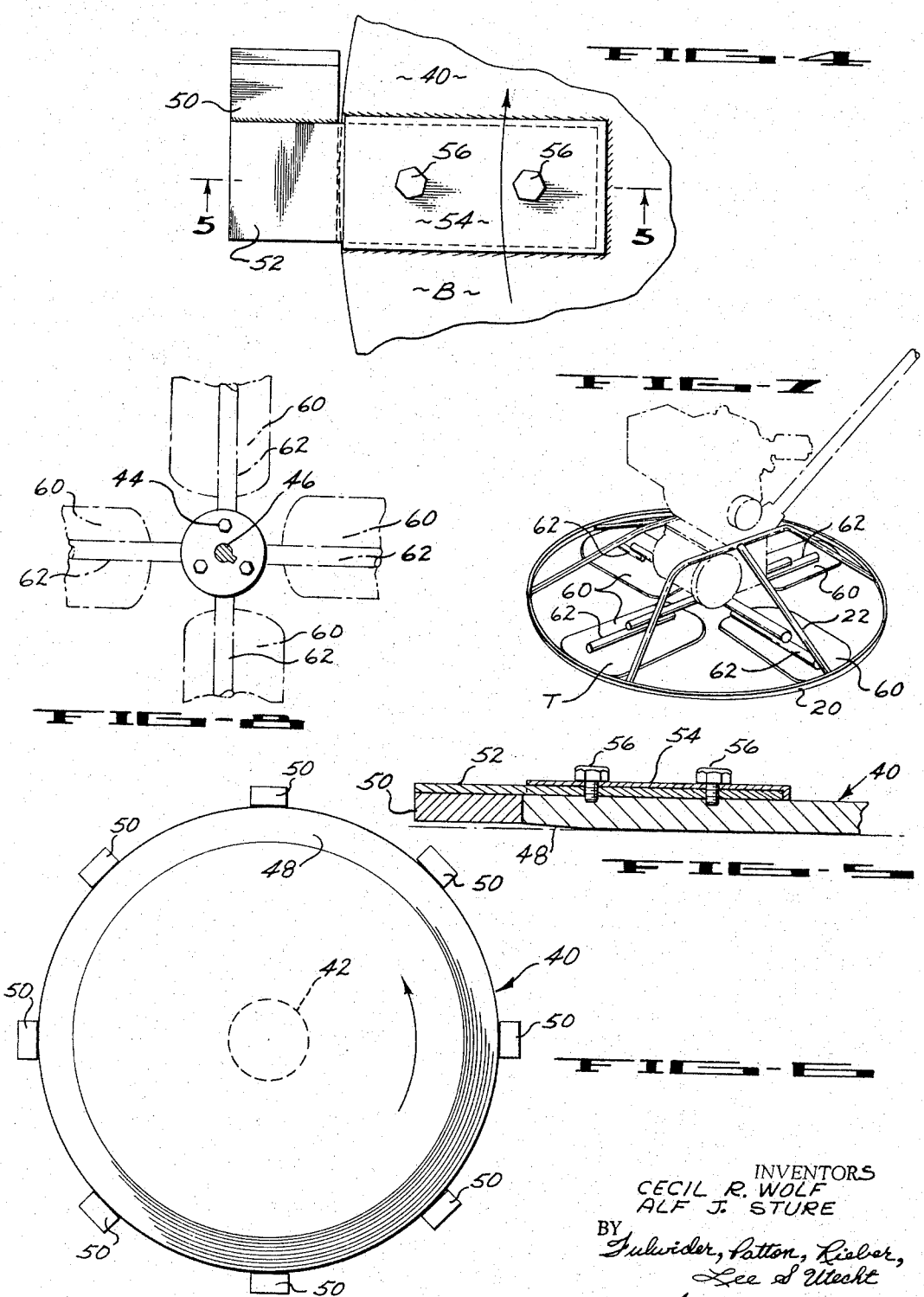

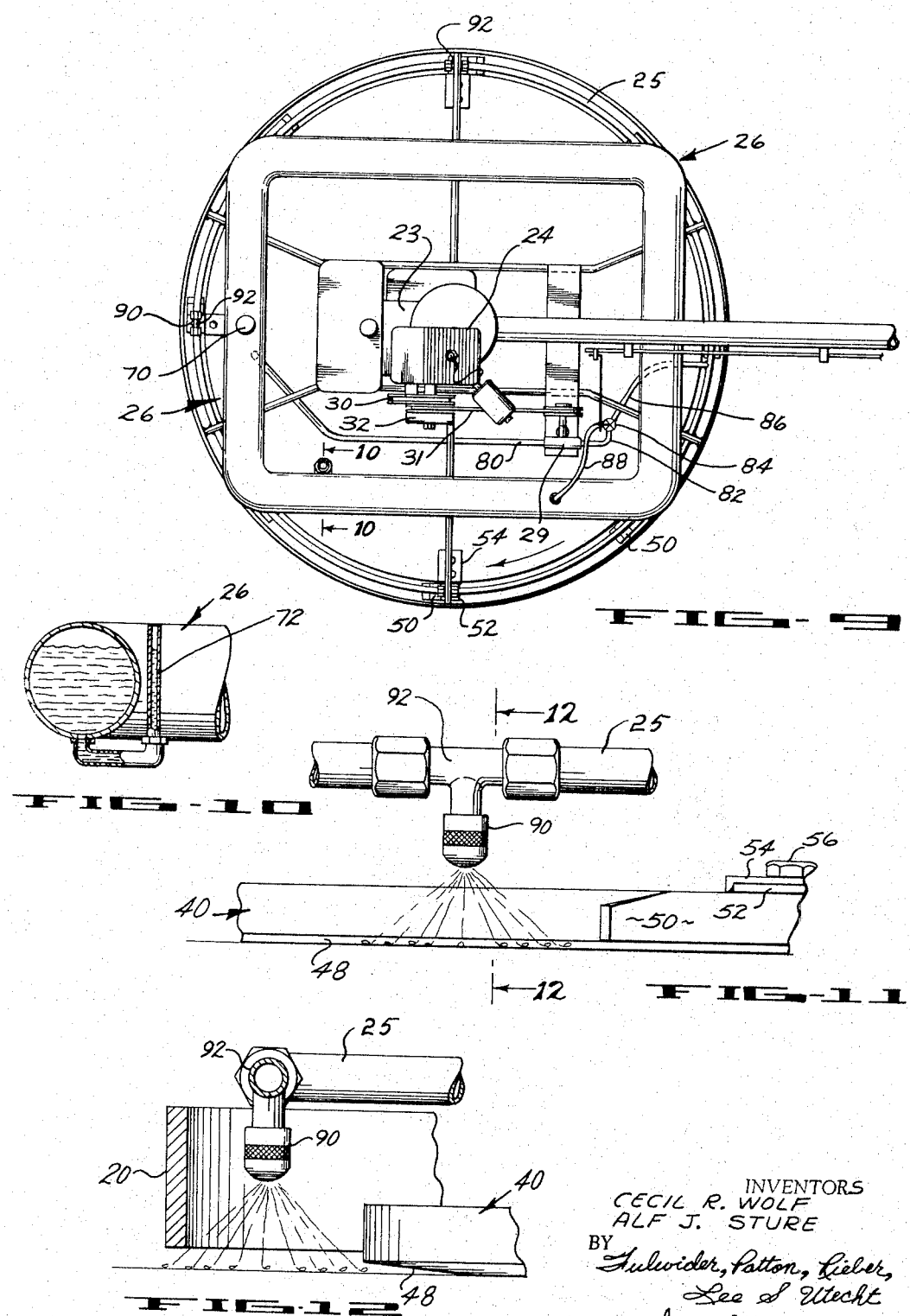

United States Patent Office 3,361,044
Patented Jan. 2, 1968

3,361,044
CEMENT FINISHING APPARATUS
Cecil R. Wolf, 467 Gaviota Ave. 90812, and Alf J. Sture, 211 E. Nevada 90806, both of Long Beach, Calif.
Filed Sept. 7, 1965, Ser. No. 485,323
4 Claims. (Cl. 94—45)

ABSTRACT OF THE DISCLOSURE

A cement finishing apparatus including an engine mounted on a frame supported on a horizontal disc and drivingly coupled therewith to rotate such disc in a horizontal plane. The underside of the disc is formed with an upwardly and outwardly extending bevel and includes radially outwardly projecting cutting blades on its periphery. A water tank is mounted on the frame and is connected with nozzle means. A pump driven by the engine provides pressurized water from the tank to the nozzles.

---

The present invention relates generally to the field of construction and more particularly to new and novel cement finishing apparatus.

More particularly, the present invention relates to machines for smoothing the unset surface of cement flooring and the like, namely, the type of machine known in the trade as a floating machine used during the process of construction of concrete or other cement floorings. This class of machine is characterized by a rotating member which rests directly upon the flooring under construction and is in fact the only part which rests upon the flooring in contradistinction to machines utilizing a wheeled frame carrying cement finishing elements lowerable upon and liftable from the surface to be treated. The rotating smoothing member of the present invention supports the frame of the machine during operation so that the entire weight of the apparatus is applied to the rotating member and through such member to the surface under treatment.

It is a major object of the present invention to provide finishing apparatus capable of imparting maximum smoothness to a cement surface.

Another object of the present invention is to provide cement finishing apparatus having its own source of water for application to the cement surface being finished. With this arrangement, it is possible to eliminate the workman conventionally utilized to dump water onto the cement by means of a pail and brush. Such workman usually mars the cement surface by his footprints, with the removal of such footprints requiring considerable time and effort. Also, where a workman attempts to deposit water on a cement surface being finished by means of a pail and brush, too much water is often placed in one spot causing the machine to form a depression when it is operated upon such spot.

It is yet another object of the present invention to provide cement finishing apparatus that is economical of construction.

A further object of the present invention is to provide cement finishing apparatus that is rugged in design and simple of construction whereby it may afford a long and trouble-free service life.

A more particular object of the present invention is to provide cement finishing apparatus having a single frame which is first usuable with a rotating bump cutter that effects initial smoothing of the cement surface, such frame being subsequently usable with a rotating troweling member that effects final smoothing of the cement surface.

Another object of the present invention is to provide a unique bump cutter for use in cement finishing machines.

A further object of the present invention is to provide cement finishing apparatus having strategically placed water dispensing nozzles that are adjustable to control the exact volume of water necessary for the finishing operation.

These and other objects and advantages of the present invention will become apparent from the following detailed description, when taken in conjunction with the appended drawings wherein:

FIGURE 1 is a perspective view of the frame member of a preferred form of cement finishing apparatus embodying the present invention;

FIGURE 2 is a horizontal sectional view, in enlarged scale, taken along the line 2—2 of FIG. 1 and showing a unique bump cutter utilized with the frame shown in FIGURE 1;

FIGURE 3 is a vertical sectional view taken on line 3—3 of FIGURE 2;

FIGURE 4 is a fragmentary top plan view in further enlarged scale showing a blade utilized with the bump cutter of FIGURES 2 and 3;

FIGURE 5 is a vertical sectional view taken on line 5—5 of FIGURE 4;

FIGURE 6 is a bottom view of the bump cutter shown in FIGURES 2 through 6;

FIGURE 7 is a perspective view showing the frame of FIGURE 1 utilized in conjunction with a troweling member in place of a bump cutter;

FIGURE 8 is a broken top plan view of the troweling member of FIGURE 7;

FIGURE 9 is a top plan view of the apparatus as arranged in FIGURE 1;

FIGURE 10 is a vertical sectional view taken in enlarged scale along line 10—10 of FIGURE 9;

FIGURE 11 is a broken side elevational view showing a nozzle utilized with said apparatus; and FIGURE 12 is a vertical sectional view taken on line 12—12 of FIGURE 11.

Referring to the drawings and particularly FIGURE 1 thereof, a preferred form of pavement finishing apparatus embodying the present invention includes a frame F which is alternatively usable with a bump cutter B shown in FIGURES 2 through 6, 9, 11 and 12, and a blade-type troweling member T shown in FIGURES 7 and 8. Both the bump cutter B and the troweling member T are adapted to rest upon a concrete surface to be finished so as to support the weight of the bump cutter or troweling member and the frame F.

More particularly, the frame F includes a rigid base ring 20 which is supported by a plurality of upwardly and inwardly extending struts 22. The struts 22 also coaxially support a water delivery tube 25 upwardly and inwardly of ring 20. The upper portion of the struts 22 are supported from the base 23 of a conventional air-cooled internal combustion engine 24. A tubular, generally doughnut-shaped water tank 26 is supported from the struts 22. An upwardly and rearwardly extending handle bar assembly 27 intersects the central upper portion of the frame F. The handle bar assembly 27 includes conventional controls for the internal combustion engine 24, as well as a water control rod 28. The engine 24 drives a conventional water pump 29 by means of endless belts 30 and 31 through a conventional clutch 32.

The bump cutter B includes a horizontal disc, generally designated 40, having its central portion removably affixed to an annular drive plate 42 by a plurality of bolts 44. As indicated in FIGURE 2, the drive plate 42 is coaxial with a vertical drive shaft 46 to which such drive plate is keyed for concurrent rotation. The drive shaft 46 is rotated by the internal combustion engine 24.

As indicated particularly in FIGURES 3, 5 and 6, the underside of the outer periphery of the disc 40 is formed with an upwardly and radially outwardly extending bevel 48. The outer periphery of the disc D carries a plurality of like cutting blades 50. Each of the blades 50 has its upper portion rigidly affixed, as by welding, to a radially inwardly extending support arm 52. Each of the arms 52 is removably supported within a bracket 54 by bolts 56. The brackets 54 are rigidly affixed, as by welding, to the upper surface of the disc 40 at equidistantly spaced points on the periphery thereof.

Referring now to FIGURES 7 and 8, the troweling member T is of conventional construction such as that shown and described in Patent No. 2,198,929. Such troweling member includes a plurality of radially extending blades 60 supported by arms 62 from a hub 63. The arms 62 are pivotable relative to the hub 63 whereby the pitch of the blades 60 may be adjusted, such arms being suitably mechanically connected to a control knob 64 carried by handle bar assembly 27. The hub 63 is adapted to be removably attached to the aforedescribed drive plate 42 by means of the bolts 44. Thus, the bump cutter B and the troweling member T are interchangeably drivingly carried by frame F.

Referring now to FIGURES 9 through 12 as well as with continued reference to FIGURE 1, the water tank 26 may be of cylindrical vertical cross-section and is preferably removably affixed to the aforedescribed frame struts 22. The front portion of the tank 26 is provided with a filler cap 70 in a conventional manner. Likewise, as shown particularly in FIGURE 10, the left hand forward portion of the tank 26 is provided with a sight-type water level indicator 72 of conventional construction.

As shown particularly in FIGURE 9, the water tank 26 is connected to the inlet of the pump 29 by a conduit 80. The discharge of the pump 29 is connected to a discharge conduit 82. The end of the discharge conduit 82 opposite the pump discharge is connected to a two-position control valve 84. In its first position, the valve 84 will direct pressurized water from the pump discharge through a conduit 86 to the aforedescribed water delivery tube 25. In its second position control valve 84 will direct pressurized water from pump 29 through a bypass tubing 88 back to the water tank 26. The position of the control valve 84 is controlled by means of the aforedescribed control rod 28.

Referring now to FIGURES 11 and 12, the aforedescribed water delivery tube 25 supports a plurality of like nozzles 90. Each nozzle 90 is supported by a T connection 92 having the opposite sides of its horizontal ends threaded to the water delivery tube 25. The nozzles 90 are of conventional construction and are adapted to control the quantity of water being delivered therethrough by merely screwing or unscrewing such nozzles relative to the vertical leg of the T 92. Preferably, the nozzles 90 can also control the lateral direction of the water sprayed therefrom.

In the operation of the aforedescribed apparatus, the bump cutter B will first be secured in place upon the drive shaft 46 by bolts 44. The water tank 26 is then filled with water and the engine 24 started. The handle bar assembly 27 is utilized to push the apparatus over the concrete surface as the bump cutter B rotates. The control rod 28 is operated to cause the valve 84 to direct water through the water delivery tube 25 and hence the nozzles 90 at any point required on the concrete surface being finished. Nozzles 90 direct the desired amount of water on this concrete surface exactly in accordance with the desires of the operator of the apparatus.

Rotation of the bump cutter B causes the blades 50 to cut off the high spots of any bumps on the concrete surface. The small cuttings made by the blades 50 are drawn under the disc 40 during the latter's rotation, the provision of the bevels 48 insuring that such cuttings are drawn under this disc as the bump cutter moves over the concrete surface. Rotation of the disc 40 also causes water to be drawn up through the concrete from underneath the disc 40. The cuttings and the water are distributed into the hollows between the high spots of any bumps for subsequent curing. Thus, these cuttings actually serve to bridge the depressions between bumps.

After any bumps have been removed from the concrete surface the troweling member T is substituted for the bump cutter B. This is easily accomplished by means of the attachment bolts 44. Rotation of the blades 60 bring up the finer cuttings or particles to the concrete surface. As the troweling operation begins the blades 60 are arranged at a comparatively flat pitch. In this manner, maximum roughening is obtained. As the concrete is gradually smoothed, the pitch of the blades is increased. Water may be dispensed through the nozzles 90 in the quantity and at the locations desired by means of control rod 28.

When it is desired to cut off the flow of water, the control rod 28 is manipulated so as to position the valve 84 to direct water from the pump discharge to the tank 26 by means of return tube 88.

It should be particularly noted that the provision of the generally doughnut-shaped tank 26 that is generally symmetrical with the frame F insures that the weight of the water is transferred substantially equally to all parts of the frame and hence to the rotating tools B and T.

While there has been shown and described what is presently considered to be a preferred embodiment of the present invention, it will be apparent that various modifications and changes may be made without departing from the spirit of the invention or the scope of the following claims.

We claim:
1. Cement finishing apparatus, comprising:
   a frame having a handlebar assembly;
   an engine on said frame;
   a horizontal disc for supporting said apparatus on the surface of uncured concrete and driven by said engine, the under side periphery of said disc being formed with an upwardly and radially outwardly extending bevel whereby said disc will ride along said surface of said uncured concrete, said disc including a plurality of rigid cutting blades at equidistantly spaced points on the periphery of said disc and extending radially outwardly therefrom and having their cutting edges facing in the direction of rotation of said disc;
   a water tank on said frame;
   nozzle means on said frame;
   a pump on said frame driven by said engine; and
   control means on said handlebar assembly controlling the flow of water from said pump to said nozzle means.

2. Cement finishing apparatus, comprising:
   a frame having a base ring supported by a plurality of upwardly and inwardly extending struts;
   an engine disposed centrally of said ring and supporting said struts and having a vertical drive shaft;
   a horizontal disc for supporting said apparatus on the surface of uncured concrete secured for rotation to said drive shaft, the underside of said disc being formed with an upwardly and outwardly extending peripheral bevel whereby said disc will ride along said surface of said uncured concrete, said disc including a plurality of rigid cutting blades at equidistantly spaced points on the periphery of said disc and extending radially outwardly therefrom and having their cutting edges facing in the direction of rotation of said disc, said disc resting upon said cement to support the weight of said frame and disc;
   a generally doughnut-shaped water tank centrally supported by said struts;
   an annular water tube supported coaxial with and adjacent said base ring by said struts;
   nozzle means on said water tube;

a pump on said frame driven by said engine and connected to said tank;
control means on said handlebar assembly; and
valve means operated by said control means to control the flow of water from said pump to said nozzle means.

3. Apparatus as set forth in claim 2 wherein said valve means directs water from said pump either to said nozzle means or back to said tank.

4. A rotatable bump cutter for smoothing cement, comprising:
a horizontal disc coaxially formed with means for attaching said disc to a power-operated driving element, the underside of said disc being formed with an upwardly and radially outwardly extending peripheral bevel whereby said disc will ride along the surface of uncured concrete;
bracket means secured to said disc at equidistantly spaced points on the periphery of said disc;
a support arm removably secured to each of said bracket means and extending radially outwardly from the periphery of said disc; and
a rigid cutting blade secured to each of said support arms and having a cutting edge facing in the direction of rotation of said disc.

References Cited
UNITED STATES PATENTS

| | | | |
|---|---|---|---|
| 2,097,806 | 11/1937 | Weidrich | 51—177 |
| 2,109,933 | 3/1938 | Sloan | 94—45 |
| 2,181,375 | 11/1939 | Leistner et al. | 94—45 |
| 2,869,442 | 1/1959 | Mincher | 94—45 |
| 2,875,676 | 3/1959 | Thieme et al. | 94—45 |
| 2,979,996 | 4/1961 | Spitler | 94—45 |
| 3,045,267 | 7/1962 | Wagner | 15—50 |
| 3,269,283 | 8/1966 | Grub | 94—45 |

JACOB L. NACKENOFF, *Primary Examiner.*